United States Patent [19]

Yamaguchi et al.

[11] Patent Number: 4,723,584
[45] Date of Patent: Feb. 9, 1988

[54] PNEUMATIC TIRES HAVING EXCELLENT TRACTION AND BRAKING PERFORMANCES

[75] Inventors: Kojiro Yamaguchi, Tokorozawa; Makoto Yamauchi, Sayama, both of Japan

[73] Assignee: Bridgestone Corporation, Tokyo, Japan

[21] Appl. No.: 862,924

[22] Filed: May 14, 1986

[30] Foreign Application Priority Data

May 14, 1985 [JP] Japan ................... 60-100394

[51] Int. Cl.$^4$ .............................. B60C 11/12
[52] U.S. Cl. .................... 152/209 R; 152/DIG. 3
[58] Field of Search ......... 152/209 R, 209 D, DIG. 3

[56] References Cited

U.S. PATENT DOCUMENTS

| | | | |
|---|---|---|---|
| 3,749,145 | 7/1973 | Hart et al. | 152/209 R |
| 3,998,256 | 12/1976 | Verdier | 152/209 R |

FOREIGN PATENT DOCUMENTS

| | | | |
|---|---|---|---|
| 59-102409 | 7/1984 | Japan. | |
| 1407790 | 9/1975 | United Kingdom | 152/209 R |
| 2030937 | 8/1978 | United Kingdom | 152/209 R |

*Primary Examiner*—Michael Ball
*Attorney, Agent, or Firm*—Sughrue, Mion, Zinn, Macpeak & Seas

[57] ABSTRACT

A pneumatic tire having excellent traction and braking performances is disclosed, which comprises a tread divided into island portions inclusive of at least one block row group by plural circumferential grooves and plural transverse grooves, and having plural sipes. In this type of the tire, the sipe is provided at its cut end with an escape hole having a size larger than that of the sipe.

9 Claims, 2 Drawing Figures

4,723,584

PNEUMATIC TIRES HAVING EXCELLENT TRACTION AND BRAKING PERFORMANCES

BACKGROUND OF THE INVENTION

1. Field of the Invention

This invention relates to pneumatic tires, and more particularly to an improvement of block type or rib-block type tread patterns in pneumatic radial tires. The specification describes development results on the improvement of traction performance and braking performance in this type of the tire.

2. Related Art Statement

The tread pattern in this type of the tire is particularly block type in many all-season (or so-called all-weather) type tires, wherein each block is always provided with plural slits each having a narrow width to actually close with each other at the ground contact surface during running under loading for exclusively enhancing the traction force on snow. On the other hand, even in block or rib-block type tread pattern of ordinary tires, substantially the same slits as described above are provided in order to mainly enhance the braking force at a wet road state. Such a slit is usually called a sipe.

The tread pattern having the arrangement of sipes is well-known, so that it is not necessary to present data on such patterns. In general, the usual sipe arrangement is roughly divided into a so-called "blind" type independently of tread grooves comprising circumferential grooves and transverse grooves, "separate" type crossing an island portion of the tread and extending between the circumferential grooves, and "semi-blind" type opening at only one end to the circumferential groove.

The invention is directed to the aforementioned semi-blind type sipe arrangement. Heretofore, this type of the sipe is said to be a compromise between the blind type and the separate type in a point that there is no fear of excessively reducing the rigidity of the island portion in the tread. However, the semi-blind type sipe has still problems that it is insufficient to improve performances on snow in the all-season tire or breaking performances at wet state in the ordinary tire and uneven wear is liable to be caused at the edge of the circumferential groove facing the sipe.

SUMMARY OF THE INVENTION

It is, therefore, an object of the invention to overcome the above problems and to improve traction and braking performances without causing uneven wear at the island portion of the tread.

According to the invention, there is the provision of a pneumatic tire having excellent traction and braking performances, comprising a tread divided into island portions inclusive of at least one block row group by plural circumferential grooves extending circumferentially of the tread and plural transverse grooves crossing with the circumferential grooves and extending toward the widthwise direction of the tread, and having plural lateral sipes each being cut from the circumferential groove to the island portion at a depth substantially equal to or less than that of the circumferential groove; said sipe being provided at its cut end with an escape hole having a size larger than that of the sipe. Here, the lateral sipe means to have an inclination angle of not more than 45°, preferably not more than 25° with respect to the rotational axis of the tire. Particularly, the inclination angle is 0°.

In the preferred embodiment of the invention, the escape hole has a size corresponding to at least 2.5 times, preferably 3–5 times the width of the sipe under a state free of internal pressure or the like. Further, the width of the sipe is about 0.5 mm. Moreover, the depth of the sipe is 0.5–1.0 times the depth of the circumferential groove.

The sipe arrangement according to the invention is composed only of the aforementioned semi-blind type or may be a combination with the blind type and/or the separate type.

DESCRIPTION OF THE PREFERRED EMBODIMENTS

Figure 1:
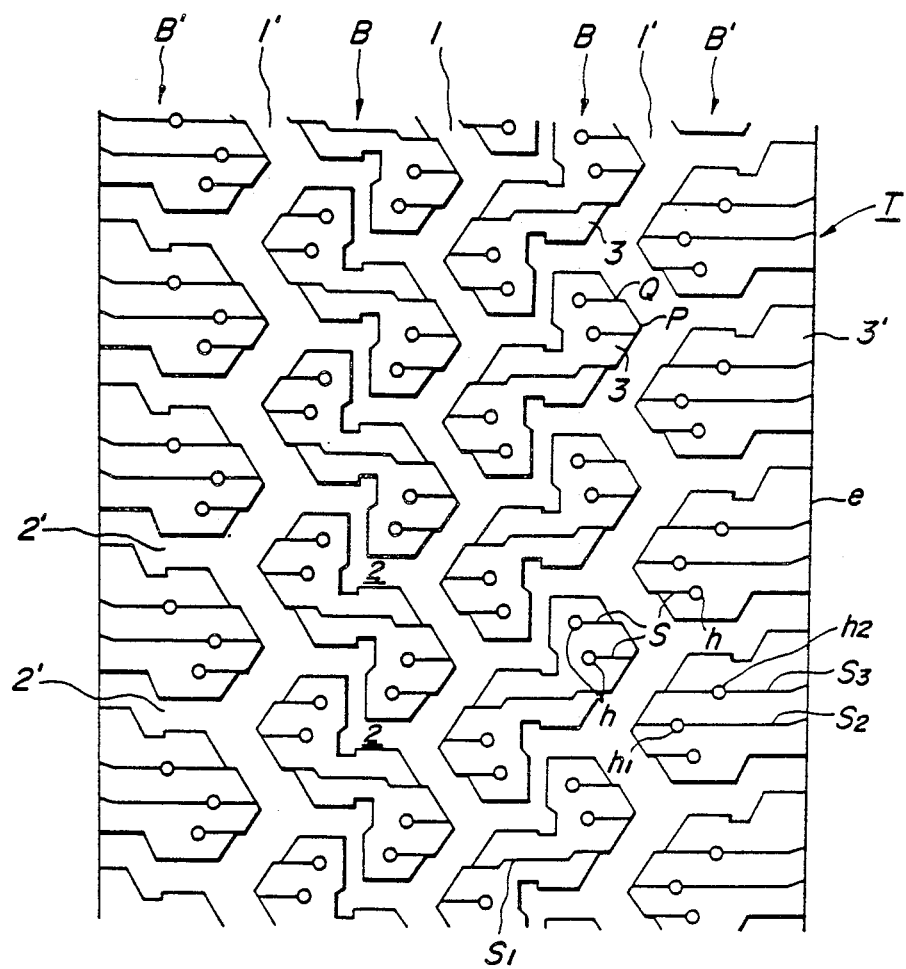
FIGS. 1 and 2 are developed views of embodiments of the tread pattern according to the invention, respectively.

In FIG. 1 is shown an embodiment of the block type tread pattern according to the invention. In this figure, T is a whole surface of the tread. The tread T is divided into four block rows in total. B consists of two central rows of blocks and B' one row of blocks at either side of a central main groove 1. A pair of main grooves 1' sandwich the groove 1, and transverse grooves 2, 2' cross with the grooves 1, 1' and extend along the widthwise direction of the tread in form of a crank in the illustrated embodiment.

Both the main grooves 1 and 1' may be two-stage zigzag type as shown in the figure. In any case, they are recessed from the tread surface T as a circumferential groove extending circumferentially of the tread T other than both side regions together with the transverse grooves 2, 2'. In this case, therefore, all of the block row groups B, B' form island portions of the tread. Moreover, a tread pattern including a so-called rib not divided by the transverse grooves 2, 2' as a tread island portion may also advantageously be included in the invention.

The tread island portions or the blocks 3, 3' in this embodiment are provided with semi-blind sipes S cut from the vicinity of convex point P and concave point Q facing the circumferential grooves 1, 1' as well as a crank type separate sipe $S_1$ dividing each block 3 of the central block row groups B and two separate sipes $S_2$, $S_3$ separating each block 3' of both side block row groups B'. At the cut end of the semi-blind sipe S an escape hole h is formed having a size larger than the width of the sipe. Furthermore, it is desirable to form substantially the same escape holes $h_1$, $h_2$ at middle positions of the separate sipes $S_2$, $S_3$. Of course, it is possible to form escape holes at both cut ends of the blind sipe.

The escape holes h, $h_1$, $h_2$ have a size corresponding to not less than about 2.5 times, preferably 3–5 times the width of the sipes S, $S_1$, $S_2$, $S_3$, which is generally about 2 mm because the width of the sipe is about 0.5 mm. Although the escape hole is circle in the illustrated embodiment, it may be triangular, rectangular, polygonal and the like. In any case, it is sufficient to determine the size of the escape hole based on the width of the sipe.

The depth of the escape holes h, $h_1$, $h_2$ is approximately equal to the depth of the main grooves 1, 1' since the depth of each sipe is substantially equal to or less than the depth of the main grooves 1, 1'. That is, the depth of the escape hole is about 0.5–1.0 times the depth of the main groove as a numerical value, and is preferably equal to or deeper than the depth of the sipe.

Figure 2:
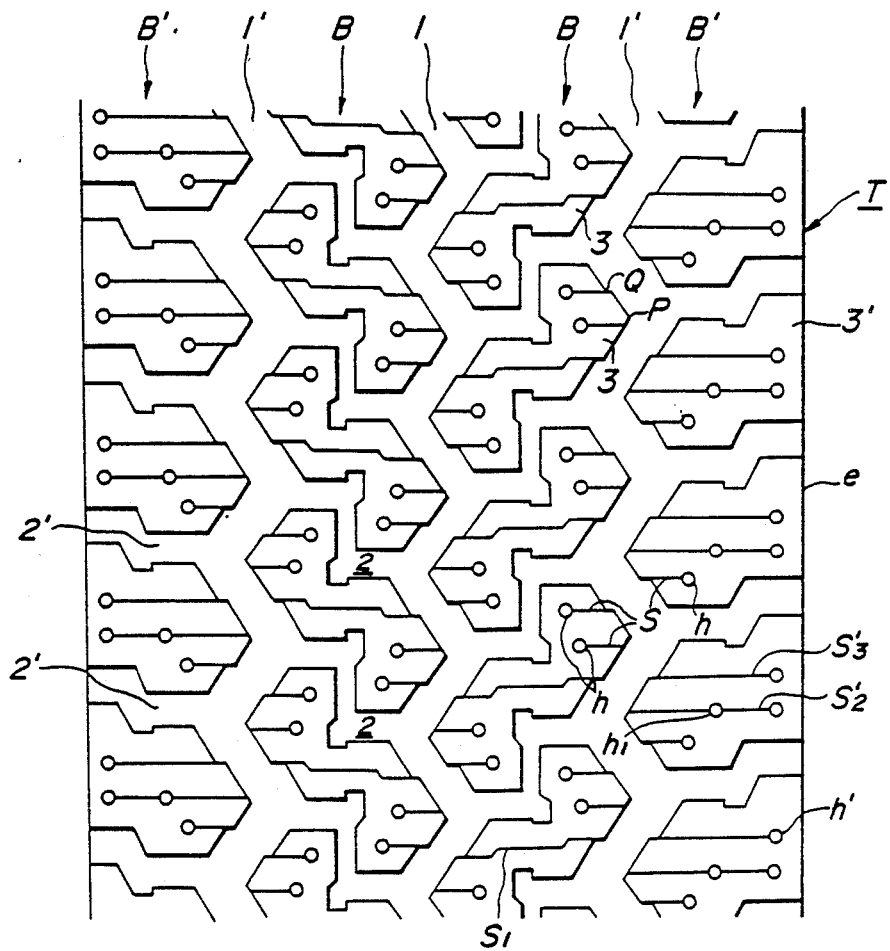

FIG. 2 is a modified embodiment of FIG. 1, wherein semi-blind sipes $S_2'$ and $S_3'$ are used istead of the separate sipes $S_2$ and $S_3$ at each block 3' of both side block row groups B'. In this case, each of the semi-blind sipes $S_2'$ and $S_3'$ is provided at its cut end with an escape hole h' having the same size as in the escape hole h, and may properly be provided at its middle position with the same escape hole $h_1$ and $h_2$. The arrangement of the semi-blind sipes $S_2'$, $S_3'$ can enhance the rigidity at outward end in the axial direction of the side block row group B'.

The escape hole h serves to make the rigidity uniform in widthwise direction along the sipe of the block by the sipe cut from the circumferential groove to the escape hole. This in turn contributes to avoid non-uniform deformation of the block along the sipe at the ground contact surface. That is, when traction force or braking force is applied to the block, the sipe is opened substantially in parallel and largely over the entire length thereof, so that the gripping performance is surprisingly enhanced as compared with the conventional type sipe. Furthermore, the escape hole acts to increase the traction force on snow and the braking force on a wet road surface together with the holding of the rigidity based on the uncut portion of the block without causing uneven wear. On the other hand, when a lateral force is mainly applied to the block during the cornering, the escape hole integrally acts with the block so as not to unnecessarily lower the rigidity of the block.

The invention will be described with reference to an example below.

A tread pattern shown in FIG. 1 was applied to an all-season tire having a size of 165 SR13.

The tire to be tested had a reinforcing structure as usual, wherein each of the sipes had a width of 0.5 mm and a depth corresponding to 0.7 times the depth of the circumferential groove. The control tire having no escape hole had the same structure.

The escape hole h was a circle hole having a diameter of 2 mm and a depth substantially equal to that of the circumferential groove.

The traction performance on snow and braking performance on wet road surface were evaluated with respect to the tire according to the invention and the control tire to obtain results as shown in the following table and represented by an index value on a basis that the result of the control tire is 100.

Moreover, the occurrence state of uneven wear in the actual running test was measured to obtain results as shown in the table.

|  | Control tire | Present tire |
| --- | --- | --- |
| Performance on snow | 100 | 110 |
| Wet performance | 100 | 110 |
| Uneven wear | partly occurred near the cut starting end of | no occurrence |

|  | Control tire | Present tire |
| --- | --- | --- |
| the sipe | | |

According to the invention, the improvement of the traction performance on snow resulted from deformation resistance and the braking performance on a wet road surface is advantageously realized by the actually uniform rigidity over substantially the entire cut length of the sipe without causing uneven wear of the tread.

What is claimed is:

1. A pneumatic tire having excellent traction and braking performances, comprising; a tread divided into island portions inclusive of at least one block row group by plural circumferential main grooves extending circumferentially of the tread and plural transverse grooves crossing with the circumferential main grooves and extending toward the widthwise direction of the tread, blocks in said block row having plural lateral sipes therein, each of said sipes having a width of about 0.5 mm to close opposed wall faces of the sipe with each other at a ground contact surface during running under a load and being cut from one of the circumferential main grooves to the island portion at a depth substantially equal to or less than that of the circumferential main grooves; said sipes having at a cut end an escape hole having a size of not less than 2.5 times the width of the sipe.

2. The pneumatic tire according to claim 1, wherein said escape hole has a size corresponding to 3-5 times the width of the sipe.

3. The pneumatic tire according to claim 2, wherein said sipe has a depth corresponding to 0.5-1.0 times the depth of the circumferential groove.

4. The pneumatic tire according to claim 1, wherein said tread is divided into plural block row groups by plural circumferential main grooves extending circumferentially of the tread and plural transverse grooves crossing with said cricumferential main grooves and tread edges, and blocks in the block row group facing the tread edge have lateral sipes extending from said circumferential main groove toward the tread edge and ending said escape hole.

5. The pneumatic tire according to claim 1, wherein said blocks have separate sipes circumferentially dividing each block.

6. The pneumatic tire according to claim 1, wherein said lateral sipes further have an escape hole at a middle portion thereof.

7. The pneumatic tire according to claim 5, wherein said separate sipes have an escape hole at a middle portion thereof.

8. The pneumatic tire according to claim 1, wherein said transverse grooves extend along the widthwise direction of the tread in form of a crank.

9. The pneumatic tire according to claim 1, wherein said circumferential main grooves form zig-zag type and said lateral sipes extend from the vicinity of convex point of said block divided by said zig-zag circumferential main groove.

* * * * *